United States Patent Office 3,700,473
Patented Oct. 24, 1972

3,700,473
PROCESS FOR TREATING REINFORCING SILICA FILLER
John S. Razzano, Troy, and Alfred H. Smith, Jonesville, N.Y., assignors to General Electric Company
No Drawing. Filed Nov. 4, 1970, Ser. No. 86,972
Int. Cl. C08h 17/04
U.S. Cl. 106—288 Q
9 Claims

ABSTRACT OF THE DISCLOSURE

The process for treating reinforcing silica filler so as to render it non-structuring when it is mixed with convertible polyorganosiloxane comprising contacting at a temperature in the range of 50° to 300° C. finely divided silica having a surface area of at least 50 square meters per gram and containing at least 0.2 weight percent absorbed water with a fluorine-substituted aliphatic acid. At the same time, prior or after the fluorine-substituted aliphatic acid is brought into contact with the silica filler, the filler is also contacted with a cyclopolyorganosiloxane.

BACKGROUND OF THE INVENTION

The present invention relates to silica fillers and, in particular, to silica fillers having a surface area of at least 50 square meters per gram with at least 0.2 absorbed water therein, which silica fillers are treated so that structuring is considerably lessened when the filler is incorporated into a convertible polyorganosiloxane.

Silica fillers are incorporated into convertible organopolysiloxanes which are cured at high temperatures in the presence of peroxides to form the cured, solid, elastic state. Further, silica fillers are mixed with silanol-stopped polydiorganosiloxanes which may then be reacted with methyltriacetoxysilane or with an alkyl silicate in the presence of a catalyst such as dibutyl tin dilaurate to cure the silanol-stopped polydiorganosiloxane to the cured, solid, elastomeric state. When certain reinforcing fillers, especially certain finely divided silica such as silica aerogel, fumed silica, which are described, for instance, in Warwick U.S. Pat. 2,541,137 and French Pats. 1,090,566 and 1,025,837, are mixed with the above convertible organopolysiloxanes producing either heat curable rubber or one or two-package RTV, it has been discovered that on standing even for short periods of time the compounded materials become tough and nervy. It has been postulated that the convertible organopolysiloxane reacting or hydrogen-bonding with the hydroxy end groups on the silica filler so as to form a unified structure. Further, the free silanol on the fumed silica hydrogen atoms bond to each other, thus forming long chains or clumps. This condition, which is known as structuring, is recognized by the presence of an undesirable snap and difficulty in rendering plastic the rubber compound by usual mechanical working. This structuring may occur even while the above silica fillers known as reinforcing fillers are being added to the convertible polyorganosiloxane on suitable equipment. After incorporation of the reinforcing filler into the convertible organopolysiloxane, it is the usual practice to store the mixture from two days to several months prior to the incorporation therein of the catalyst and the curing of the organopolysiloxane to the cured, elastomeric state. This period of storage is usual, especially in the case for two-package RTV and heat-curable rubbers. However, after being stored for periods of two days to several months, the convertible organopolysiloxane filler mixture has structured to the point that it is excessively tough and nervy and, as a result, excessive milling times are required to form a plastic continuous film around the faster roll of a two-roll differential mill, which are normally used for rendering the stored compound plastic prior to further processing of the compound. This milling is for the purpose of incorporating other fillers, additives, such as curing agents, compression set additives, or for freshening the compound so as to give better flow in subsequent molding calendering or extrusion operations.

The structuring of the convertible organopolysiloxane in the filler results in the inability to obtain a plastic film on a differential mill in a short period of time due to the fact that the compound on the rolls will not knit readily within a reasonable period of time. In some instances, the mixture will not knit at all, even after long periods of milling. It is often impossible to obtain a satisfactory plastic condition with the results that the mixture is discarded with economic losses. The term "knit" or "knitting" referred to in the above description is intended to mean the readily fusing of the laps and folds of a vulcanizable silicone rubber stock to form a continuous homogeneous texture of sheet during milling. A more complete definition of this knitting property is found disclosed in the book "The Vanderbilts 1948 Rubber Handbook," p. 79, 9th edition, published in 1948 by the R. T. Vanderbilt Company, 230 Park Ave., New York, N.Y. The term "knit time" is intended to mean the time required to produce this homogeneous fused sheet.

In U.S. Pat. 2,938,009, Lucas, the inventor discloses the treating of reinforcing filler with a cyclopolyorganosiloxane from 24 hours to 72 hours. This process, in accordance with the disclosure of Lucas, reduces structuring to an acceptable level and further reduces the knit time. The cyclic organopolysiloxane treatment of Lucas, while effective, is limited that it can only treat the filler to a certain extent, that is it can render the filler inert so that it does not react with the convertible polyorganosiloxane only to a limited level. Further, the Lucas filler, although it decreases the amount of process aid used with the convertible organopolysiloxane, it does not decrease the amount of the process aid needed to an acceptable level. Further, the process of Lucas only slightly decreases the amount of bench creep in the convertible polyorganosiloxane and filler mixture. Bench shrink is the shrinkage of the mixture of polymer and filler after it has been mixed and cut into slabs and prior to the insertion of it into process equipment, such as molding equipment. It is desirable in such applications that the convertible organopolysiloxane and filler mixture be dimensionally stable so it will not shrink and be unable to fill the mold after it has been cut into slabs for that purpose. It is thus desirable to reduce this bench creep so as to facilitate the processing of the convertible organopolysiloxane and filler mixture. Further, while the structuring of the convertible organopolysiloxane and filler mixture is decreased by the Lucas process, there is some structuring that is still present which makes the mixture difficult to process in molding and calendering equipment.

In the silanol-stopped convertible polydiorganosiloxane which is used for one-package and two-package RTV, it is desirable to add a filler which will lower the viscosity and increase the strength of the final cured elastomeric product. The treated filler of Lucas does not accomplish this.

The patent to Brown et al., U.S. Pat. 3,334,062 discloses another process for treating reinforcing fillers. This process as disclosed in the patent comprises contacting at a temperature of 15° to 170° C. a finely divided silica with a cyclic siloxane of the formula $(R_2SiO)_3$ in the presence of at least 0.2 mole percent of a catalyst selected from the group consisting of ammonium hydroxide, ammonium carbonate and other ammonium compounds and amines. Since ammonia, which is given off by the ammonium compounds, is trifunctional, it causes an agglomeration, inter-particle associations, and defluidization of the filler when it is aded to it so that the reinforcing filler is very difficult to treat and pump from area to area. Further, ammonia compounds and amines will cause the silanol-stopped convertible polydiorganosiloxane used in two-package RTV to condense and thus cause the convertible polyorganosiloxane and filler mixture to structure prior to the incorporation therein of the curing catalyst. Further, amines and ammonia poison the tin catalyst which is often used with two-package RTV compositions. Furthermore, secondary amines which can be used under the process of Brown et al., even if left in trace quantities in the reinforcing filler, will impart objectionable odor to the cured elastomeric rubber which lessens the marketability of the product.

It is one object of the present invention to provide a process for treating silica reinforcing filler which renders the filler more inert to the convertible organopolysiloxane with which it is mixed so as to substantially decrease structuring of the mixture.

It is another object of the present invention to provide a process for treating reinforcing silica filler so as to decrease the bench creep and render it dimensionally stable so that a mixture of the filler and a convertible organopolysiloxane has little bench creep and is dimensionally stable so that it can be processed easily on the usual processing equipment.

It is still another object of the present invention to provide a process for treating reinforcing silica filler such that when the filler is mixed with a silanol-stopped convertible polyorganosiloxane, it will not cause the convertible polyorganosiloxane to condense and such that the filler will not have any effect whatsoever on the usual compositions.

It is yet another aim of the present invention to provide a process for treating reinforcing silica filler such that the silica filler can be incorporated into convertible organopolysiloxanes without imparting objectionable odors to the finished cured elastomeric product.

It is an additional object of the present invention to provide a silica filler which has been treated so that when it is incorporated into a convertible organopolysiloxane it will not cause the organopolysiloxane to condense or structure to any appreciable extent.

These and other objects of the present invention are accomplished by the invention set forth below.

SUMMARY OF THE INVENTION

A process for treating a reinforcing silica filler so as to render it substantially non-structuring when it is mixed with a convertible polyorganosiloxane comprises contacting at a temperature of 50°–300° C. a finely divided silica having a surface area of at least 50 square meters per gram and containing at least 0.2 weight percent of absorbed water based on the weight of the silica, with a cyclic polyorganosiloxane corresponding to the general formula:

(1) $(R_2SiO)_n$ where R is a monovalent hydrocarbon radical and $n$ is an integer equal to from 3 to 9, inclusive, and a fluorine-substituted aliphatic acid which is selected from monocarboxylic aliphatic acids of the formula:

(2) 

and aliphatic dicarboxylic acid of the formula:

(3) 

where R' is a radical selected from the group consisting of alkyl, alkenyl, aryl, aralkyl, cycloalkyl and cycloalkenyl, X represents the same radicals as R' and, in addition, chlorine and fluorine, $R^2$ is selected from hydrogen, chlorine, fluorine and the same radicals as represented by R' and $R^3$ is a divalent hydrocarbon radical selected from alkylene and arylene and $a$ is a whole number which varies from 0 to 1, inclusive. The process of the present case is preferably carried out when said cyclic polyorganosiloxane is brought into contact with said silica prior to bringing said filler into contact with said fluorine-substituted aliphatic acid.

There is formed by the process of the present case a pyrogenic silica filler having a surface area of at least 50 square meters per gram and substantially free of infrared absorbance at 3760 centimeters minus 1 containing 5 to 8 percent by weight of diorganosiloxy units chemically combined with said silica.

DETAILED DESCRIPTION OF THE PREFERRED EMBODIMENT

The radical R may represent any monovalent hydrocarbon radical, e.g., alkyl radicals, such as methyl, ethyl, isopropyl, tertiary butyl, hexyl, octyl, decyl, myricyl; alkenyl radicals, such as vinyl, allyl, methylallyl, hexenyl, butadienyl, cycloaliphatic radicals such as cyclopentyl, cyclobutyl, cyclohexyl, aralkyl radicals such as benzyl and ethyl and ethylphenyl and aromatic carbon radicals, such as phenyl, xylyl, naphthyl and benzyl. The radical R' represents monovalent hydrocarbon radicals such as alkyl radicals, e.g., methyl, ethyl, propyl, octyl, dodecyl radicals, etc., aryl radicals, for example, phenyl, tolyl, xylyl radicals, etc.; aralkyl radicals, for example, benzyl, phenylethyl radicals, etc.; cycloalkyl and cycloalkenyl radicals, for example, cyclohexyl, cycloheptyl, cyclohexenyl, radicals, etc.; alkenyl radicals, for example, vinyl, allyl radicals, etc.; alkaryl radicals, cyanoalkyl radicals, haloalkyl, haloalkenyl and haloaryl radicals, e.g., chloromethyl, chlorophenyl, dibromophenyl, trifluoromethyl, and ethyl radicals, etc. The radicals $R^2$ and $R^3$ have been defined above. The radical $R^3$, in particular, may be alkylene, arylene, radicals such as methylene and phenylene. The preferred substituent groups for R are methyl and ethyl, and where $n$ is equal to 3 or 4. The preferred case for Formula 2 is the case where $a$ is equal to 0, X is fluorine such that the compound is trifluoroacetic acid. In the case of the compound of Formula 3, the preferred case is where $R^2$ is fluorine and $R^3$ is methylene. It is important to have at least one fluorine atom and preferably 2 or more fluorine atoms attached to the alpha carbon atom such that as a result of the fluorine atoms being attached to the alpha carbon atom, the acid would be a strong carboxylic acid.

The fluorine-substituted aliphatic acid is a catalyst in the present invention in promoting the reaction of the cyclopolyorganosiloxane of Formula 1 with the silica filler. Advantageously, it is completely removed from the silica filler after the treatment has been completed. This fluorine-substituted aliphatic acid which includes fluorine-substituted aliphatic monocarboxylic acid and fluorine-substituted aliphatic dicarboxylic acids includes such acids as trifluoroacetic acid, fluoroacetic acid, difluoroacetic acid, fluorodifluoroacetic acid, 2-fluoropropionic acid, 2-dichlorobutanoic, 2,3-difluoropentanoic, perfluorosuccinic and perfluorobutanoic acid. The fluorinated aliphatic acid is formed by fluorinating the corresponding aliphatic acid with hydrogen chloride in the presence of an electrical current to produce the resulting fluorinated compound and then acidifying it with a strong acid-water solution, such as hydrogen chloride in the form of a water solution. Thus, in the case of acetic acid, the acid is placed in a water solution of hydrochloric acid and a current of 5 volts is passed through the solution for 5 minutes. The resulting fluorinated compound is distilled off and collected. The fluorinated compound is then hydrolyzed with water to produce the desired trifluoroacetic acid. Trifluoroacetic acid is the preferred catalyst acid of the present invention. Generally, 500 to 4,000 parts per million of trifluoroacetic acid is used in the treatment of the silica filler based on the weight of the silica filler and, preferably, 500 to 1,000 parts per million. If less than 500 parts per million is used, then there is not the desired catalytic activity in the processing of the silica filler. If more than 4,000 parts per million is used, then the large amount of acid does not have any additional catalytic activity in the treatment of the silica filler and further such acid is harder to remove completely from the silica filler.

The finely divided reinforcing fillers which are achieved in accordance with the present invention and which cause the above described structure buildup are usually finely divided silica fillers which may have free hydroxyl groups in the form of absorbed moisture or silicon-bonded hydroxyl groups. These structure-inducing fillers which originally contained hydroxyl groups, for instance hydroxyl groups bonded directly to the silicon molecule may no longer contain hydroxyl groups due to modification of such silicas, for instance by the introduction of silicon-bonded alkoxy groups in place of some of the silicon-bonded hydroxyl groups. Such silicas would be alkoxy groups substituted for the hydroxyl groups causing increased structure and knit times when these silica fillers are incorporated into convertible organopolysiloxanes. These silica fillers are reinforcing fillers in contrast to other fillers of the nonreinforcing and usually non-structure forming types, such as titanium dioxide, lithopone, calcium carbonate, etc. Examples of such structure causing silica fillers may be found described in U.S. Pats. 2,541,137, 2,610,167 and 2,657,149, as well as French Pats. 1,025,837 and 1,090,566.

These structure-causing fillers may be slightly acidic or alkaline, depending upon the method of manufacture and may be obtained through the aerosol-aerogel process by fuming processes or the vapor phase burning of silicon tetrachloride, ethyl silicate or by any other means. The manner in which such silica fillers are treated in accordance with the present invention requires the utilization of certain techniques in order to obtain the optimum results. In carrying out the above process, it is desirable that the cyclic organopolysiloxanes employed be sufficiently volatile so that at temperatures of from 50° C. to 200° C. either at normal pressure or when using reduced pressures there will result ready volatilization of the cyclic organopolysiloxanes and the fluorinated aliphatic acid. This causes the cyclic organopolysiloxane and the fluorinated aliphatic acid to pass throughout the silicone particles. Since the cyclic polyorganosiloxane and the fluorinated aliphatic acid are volatilized and are placed in a vapor form when they are used to treat the silica filler, they may easily be removed therefrom by simply, for instance, purging the mixture with nitrogen gas.

It has been discovered that one of the best methods for obtaining the treated fillers is to mix the filler intimately with the cyclic polyorganosiloxane and the fluorinated aliphatic acid both of which are added preferably in the form of a liquid and then heating the entire mixture so as to volatilize the cyclic polyorganosiloxane and the fluorinated aliphatic acid. Preferably, 5 to 20 percent by weight of the cyclic polyorganosiloxane based on the filler is added to the mixture so that there will be some excess of the cyclic polyorganosiloxane in addition to the amount that will react with the silica filler or be added onto the silica filler. After effecting the intimate dispersion of the filler and volatile cyclic polyorganosiloxane liquid and the fluorinated aliphatic acid, the mixture is then heated at temperatures such as those recited above, that is, 50 to 200° C. to permit diffusion of the cyclic organopolysiloxane fluid throughout the filler mass. After the cyclic polyorganosiloxane and the fluorinated aliphatic acid is removed from the mixture, it will be found that the filler has reacted with or absorbed thereon 5 to 8 percent by weight of cyclic organopolysiloxanes based on the initial weight of the silica filler.

In order to carry out the invention of the present case, it is necessary that the silica filler have some water absorbed onto it, which water may be added or may be present in the silica filler as it has been prepared. Generally, for the process of the present case to be effective, there must be $y/200$ weight percent water or free hydroxyl groups in the silica filler based on the weight of the silica filler, where $y$ is the surface area in square meters per gram of the silica filler. Thus, where $y$ is 200 square meters per gram, it is necessary for the silica filler to have one weight percent water in the silica filler for the process of the present case to be effective. Where the surface area of the silica filler is 400 square meters per gram, then it is necessary for the silica filler to have two weight percent water absorbed onto it for the process to be effective. In order for the treating process to be effective, it is further desirable that most or all of the water be removed from the filler as the result of the treating process. The moisture in the filler adversely affects the properties of the mixture of the convertible organopolysiloxane. By means of the treating with the volatile cyclic polyorganosiloxane, the latter acts as an azeotropic agent so as to remove the traces of moisture and displace the moisture with a very thin film of the cyclic polyorganosiloxane firmly absorbed in the fluid particles.

The removal of the moisture from the silica filler greatly enhances the electrical properties of the cured product. Generally, the heating is carried out at a temperature and atmospheric pressure above the boiling point of the cyclic polyorganosiloxane and fluorinated aliphatic acid. For instance, with the octamethylcyclotetrasiloxane, it is usually only necessary to heat the mixture of the filler and the octamethylcyclotetrasiloxane at a temperature of about 150°–300° C. from about 0.5 to 4 hours employing any desired pressure and preferably 0.5 to 2 hours. Since the boiling point of octamethylcyclotetrasiloxane is around 177° C., it is apparent that the aliphatic fluorinated acid and particularly trifluoroacetic acid which has a boiling point of 80° C. will also be volatilized.

It can be appreciated that the temperature and times that may be used for treating the filler with the cyclic organopolysiloxane and the fluorinated aliphatic acid may vary widely, depending upon such conditions as the amount and type of cyclic organopolysiloxane used, the type of filler used and is usually dependent upon time and temperature when integrated with the use of reduced pressures. At high reaction temperatures in the range disclosed above, the filler need only be treated for one or two hours with the cyclic polyorganosiloxane and fluorinated aliphatic acid. However, at lower temperatures, that is at 50° C., the filler may have to be treated with a cyclic organopolysiloxane and a fluorinated aliphatic acid for a period as long as 72 hours. Once the cyclic polyorganosiloxane and the fluorinated aliphatic acid have been volatilized and the filler thoroughly mixed therewith for the periods required for treatments such as, say, 0.5 to four hours at a temperature of 180° C., the reaction chamber may simply be evacuated to remove all of the fluorinated aliphatic acid and the excess of the cyclic organopolysiloxane. The filler may then be dried in an air oven for at least 1 hour and preferably 1 to 20 hours.

It is obvious that other methods for treating the reinforcing silica fillers may be employed without departing from the scope of the invention. As one example, another method for treating the silica filler in accordance with the present invention comprises continuously introducing into the heated atmosphere finely divided structure-inducing silica filler and the cyclic polyorganosiloxane, as well as the fluorinated aliphatic acid.

After treatment with the cyclic polyorganosiloxane and the fluorinated aliphatic acid and in accordance with the process described above, it has been found that the fillers so produced are hydrophobic and remains so even after long periods at elevated temperatures. Thus, in the case of treatment of the filler with octamethylcyclotetrasiloxane, the treated filler can be heated for long periods of time at 250° C., well above the boiling point of the octamethylcyclotetrasiloxane without any apparent change in the hydrophobicity of the filler. It is further desirable that the bulk density of the treated filler remain the same as compared to the bulk density of the initial untreated filler. This is in direct contrast with the results that are usually obtained by treating fillers with some of the organosilicon compositions described in the prior art.

When one employs, for instance, trimethylchlorosilane, which is a material often disclosed for the purpose of treating fillers, not only does the operator have to cope with the evolution of hydrogen chloride released in the treatment, but further the bulkness of the product has been clearly reduced. In the present case, the bulk density remains substantially the same after the treatment as it was prior to treatment. It may also be pointed out that there is very little change in weight of the treated filler because of the treatment with the cyclic organopolysiloxane and the fluorinated aliphatic acid. As pointed out previously, the fluorinated aliphatic acid is merely a catalyst to permit higher efficiency in the reaction and absorbance of the cyclic organopolysiloxane onto the filter with the result of the removal of hydroxyl groups and moisture groups from the filler. Thus, the water content of the silica filler is reduced by 0.5 weight percent or more. In the case of silica fillers having a surface area of 50 square meters per gram, the weight is increased by 5 to 8 percent by the absorbance and reaction of the cyclic organopolysiloxane with the filler. Thus, the increased weight of the filler as the result of treatment is only 5 to 8 weight percent based on the weight of the untreated silica filler. This small increase in weight does not have any substantial effect on the properties of the silica filler but, in fact, it provides the additional benefits when it is mixed or utilized with the convertible polyorganosiloxane.

After the treatment of the filler is completed, the treated filler is then incorporated into convertible polyorganosiloxane and the mixture is then stored for long periods of time. When it is desired to use the same, it can be readily milled in a relatively short period of time when it will be found that it will readily sheet and form a continuous film on the rolls, thereby permitting the incorporation therein of curing agents, dyes, pigments, compression set additives, etc., when desired. If one employs initially untreated filler with the convertible organopolysiloxane, it will be found that after storage of the silicone rubber compound and the structure-inducing filler mixture, long periods of time would be required even before the silicone rubber compound will start to form a sheet and longer times will expire before the compound will adhere to the rolls.

By convertible organopolysiloxane is meant to refer to three types of organopolysiloxanes, that is the polyorganosiloxane used to form heat curable rubbers. The silanol-stopped organopolysiloxanes used to form one and two-package RTV compositions. The convertible organopolysiloxane used to form heat curable rubbers is well known in the art and can contain the same or different silicon-bonded organic substituents, for example, hydrocarbon radicals, for instance methyl, ethyl, propyl, vinyl, allyl, phenyl, benzyl, phenylethyl, naphthyl, etc., halogenated organic radicals, chlorophenyl, tetrachlorophenyl, methyl, phenyl and other types of radicals, connected to the silicon atom by carboxylic linkages may be employed in the present invention without departing from the scope of the invention. The particular type of convertible heat curable organopolysiloxane is not critical and can be any one of the types described in patents such as Agens Pat. 2,448,756 and Sprung et al. Pat. 2,448,556. These convertible heat curable organopolysiloxanes generally are obtained by condensation of a liquid organopolysiloxane having an average of 1.98 to 2.02 organic groups per silicon atom.

Such polysiloxanes are produced by following the procedure involving the hydrolysis of one or more hydrocarbon-substituted dichlorosilanes where the substituents consist of saturated hydrocarbons to produce a mixture of linear and cyclic polysiloxanes. The crude hydrolyzate can then be treated with potassium hydroxide to form mixtures of low boiling, low molecular weight cyclic polymers and undesirable materials such as monofunctional and trifunctional chlorosilanes starting material. The resulting composition is fractionally distilled and there is collected a pure product containing a low boiling, low molecular weight cyclic polymer free of insignificant amounts of monofunctional or trifunctional groups. In order to depolymerize the crude hydrolyzate, the distillate consisting essentially of low molecular weight cyclic polymers free of insignificant amounts of monofunctional or trifunctional groups is collected in a vessel. The cyclic polyorganosiloxanes are the compounds of Formula 1 which are used in the present invention.

However, in order to produce the convertible heat cured polyorganosiloxanes, a portion of the distillate may be taken and dried so that it contains less than 50 parts per million of water. The pure cyclic siloxanes are then added in the desired portions in a reaction vessel and are subjected to an equilibration reaction to form the heat curable convertible polyorganosiloxanes. To the mixture of pure cyclic siloxanes there is added a polymerization condensation catalyst such as ferric chloride hexahydrate, phenyl phosphoryl chloride, alkaline condensing agents such as potassium hydroxide, cesium hydroxide, sodium hydroxide, and others. The condensing agent, such as potassium hydroxide, breaks the ring of cyclic siloxanes to form a potassium silanolate which can then attack other cyclics to break the rings and increase the chain length of the siloxanes formed. There is further added to the reaction mixture in the amount of one or more monofunctional compounds to function as end-blockers, limiting the degree of polymerization and consequently the molecular weights of the linear polysiloxane chains. Usually a small amount of monofunctional compounds is added to function as end-blockers so as to regulate the chain length of polymers. Monofunctional compounds that may be employed satisfactorily for controlling polymer growth, including among others, hexamethyldisiloxane, tetramethyldiethoxydisiloxane, diethyltetraethoxydisiloxane, and divinyltetraethoxydisiloxane. The equilibration reaction is carried out from 3 to 4 hours until about 85% of the cyclic diorganosiloxanes have been converted to polymers and end-stopped with monofunctional groups. When the 85% conversion point has been reached, there are just as many polymers been converted to the cyclic siloxanes as there are cyclic siloxanes being converted to the polymer. At that time, there is added to the mixture a sufficient amount of neutralizing agent that will react the potassium hydroxide catalyst so as to terminate the polymerization reaction. The cyclic organopolysiloxanes in the reaction mixture are then distilled off to leave the polydiorganosiloxane gum which is the convertible heat cured polyorganosiloxane that is useful with the fillers of the present case. Preferably, the organic substituents and the convertible heat curable polyorganosiloxane are at least 50% methyl and the rest are phenyl radicals, linked to a silicon by a silicon-carbon linkage. The monofunctional terminal groups are preferably trimethylsiloxy units.

The amount of the treated structure-inducing filler used in combination with the convertible heat curable organopolysiloxane may vary within wide limits, for instance from 10 to 200 percent by weight of filler based on the weight of the convertible, heat curable organopolysiloxane. The exact amount of filler used can depend upon such factors as, for instance, the application for which the convertible organopolysiloxane is intended, the type of filler employed, the type of convertible heat curable organopolysiloxane employed and other factors. The structuring difficulty is particularly noticeable when the above described filler comprises from 0.2 to 0.8 part filler per part of convertible organopolysiloxane.

One of the advantages of treating the fillers in accordance with the present invention is that larger amounts of filler can be incorporated into the convertible heat cured organopolysiloxane and without undesirable effects on the properties of the cured products. Examples of other fillers which may also be treated in accordance with the above process and which may be incorporated in combination with treated structure-inducing fillers may be, for instance, titanium dioxide, lithopone, zinc oxide, zirconium silicate, iron oxide, datomaceous earth, finely divided sand, calcium carbonate and others.

After the filler has been incorporated and mixed into the convertible heat cured polyorganosiloxane, the mixture may then be stored for extended periods of time, such as serveral months, with a minimum of the undesirable structuring taking place in the mixture. To convert the filler-organopolysiloxane mixture into the cured elastomeric state, there is incorporated into the mixture any of the well known peroxide catalysts and the mixture is heated at elevated temperatures in the range of 150° to 300° C. to cure the mixture into the cured, solid, elastomeric state. Among such curing peroxide catalysts are benzoyl peroxide, tertiary butyl perbenzoate, bis(2,4-dichlorobenzoyl)peroxide and others.

The curing catalyst may be present in an amount ranging from 0.01 to as high as 4.8 percent or more by weight based on the weight of the convertible heat cured organopolysiloxane. Usually with such convertible heat cured polyorganosiloxane rubbers, there is present a process aid which facilitates the processing of the composition. Examples of such process aids are to be found in Martellock U.S. Pat. 3,464,945 and in Konkle et al. U.S. Pat. 2,890,188 and Fekete U.S. Pat. 2,954,357. The Konkle et al. process aids are hydroxylated organosilanes which contain from 1 silicon-bonded hydoxyl per 70 silicon atoms to 2 silicon-bonded hydroxyls per silicon atom comtaining 1.9 to 2.1 hydrocarbon radicals per silicon atom.

The treated fillers of the present case are especially desirable when mixed with convertible heat cured polyorganosiloxanes since they reduce the amount of process aid or, in some cases, entirely eliminate the necessity for the use of the process aid. Further, the use of the treated fillers of the present case reduces the bench creep in the convertible polyorganosiloxane treated filler mixture such that the mixture can easily be processed in slab forms and put on molding machines, calendering equipment and other types of processing equipment.

Another type of convertible polyorganosiloxane is a diorganopolysiloxane which is silanol-stopped and which is used to form room temperature vulcanizable rubber. Such silanol-stopped diorganopolysiloxane is formed from cyclic organopolysiloxanes as is the case with the convertible heat cured organopolysiloxane. However, instead of using monofunctional trimethylsiloxy units to chain-stop the polymer chain during the equilibration reaction, there is added to the mixture a sufficient quantity of water so that the polymer chain will be end-stopped with hydroxyl groups. The amount of water added during the equilibration reaction of the cyclic organopolysiloxanes in the presence of a condensation catalyst such as potassium hydroxide will determine the chain lengths of the polymer. In the case of two-package RTV the silanol-stopped organopolysiloxane is mixed with the treated filler and then stored, and this storage period may be an extended time of several months or more. As pointed out previously, if amines or ammonia were present in the treated filler, then during the storage period the amines and ammonia would cause further condensation of the silanol-stopped organopolysiloxane so as to cause structuring. In the present case, the trifluorinated aliphatic acid is completely removed from the filler so that the treated filler is substantially intert to the silanol-stopped organopolysiloxane and there is no further condensation of the polymer. Further, as distinguished from the case where amines and ammonia are used to treat the filler, the treated filler of the present case does not contain any impurities which will poison any catalyst added to the mixture to cure it.

It has also been noticed that the treated filler as distinguished from the treated fillers of the prior art increases the strength of the final cured silicone rubber composition which was formed from the two-package and one-package room temperature vulcanizable compositions. Further, when the treated filler of the present case is added to the silanol-stopped diorganopolysiloxane it lowers the viscosity of the polymer so that the polymer is easier to process.

To produce the one-package RTV compositions, there is utilized a silanol-stopped diorganopolysiloxane as with two-package RTV, into which there is mixed the treated filler. There is then incorporated into this mixture alkyltriacetoxysilane. The treated fillers of the present case are particularly valuable with one-package RTV because when they are used in combination with the silanol-stopped fluids they do not cause appreciable thickening of the fluid.

In evaluating the treated fillers of the present case, in the examples there was used to aminoxy structure test. In this test the treated filler is mixed with a silanol-stopped diorganopolysiloxane oil into which is incorporated aminoxy curing agents, such as 1,3,5,7,7-pentamethyl - 1,3,5 - tris(diethylaminoxy)cyclotetrasiloxane and 1,3,5,5,7,7 - hexamethyl - 1,3 - bis(diethylaminoxy) cyclotetrasiloxane where there is used 16 parts of the latter curing agent to 1 part of the former curing agent. This aminoxy curing agent is a very rapid curing agent which starts to cure the silanol-stopped diorganopolysiloxane almost immediately. To 16 parts of the silanol-stopped diorganopolysiloxane oil, there is added 0.5 part of the aminoxy curing agents and 3.5 parts of the filler. These ingredients are then mixed together by hand for one to five minutes and then a portion of the mixture is placed on a Boeing flow jig which measures the flow properties of the mixture. The flow properties of the mixture is tested by taking the horizontal test jig and standing it on one end so that the polysiloxane mixture can flow vertically downward. The amount of flow downward due to the force of gravity after 10 minutes is measured in inches of flow.

EXAMPLE 1

To 20 g. of Cab-O-Sil MS–7, which is a pyrogenic filler having a surface area of 200 square meters per gram and a water content of 1% by weight which is placed in a flask, there is added 30 g. of hexamethylcyclotrisiloxane and 0.5 cc. of trifluoroacetic acid. The mixture is then stirred and the reaction is carried out at 150° C. for four hours. The volatilized cyclic trisiloxane-trifluoracetic acid is reacted and then the treated silica filler is placed in an air oven and dried at 300° C. for 24 hours.

The above process is repeated but without the use of trifluoroacetic acid. Both fillers are then tested using the aminoxy structure test. The mixture which has incorporated the filler treated with trifluoroacetic acid has a flow on the test jig of 0.3 inch in ten minutes. The silanol diorganopolysiloxane oil which has been incorporated therein the filler which is just treated with a cyclic polysiloxane and without any trifluoroacetic acid has no flow and crumbles.

EXAMPLE 2

There is mixed 200 g. Cab-O-Sil MS–7, a pyrogenic filler having a surface area of 200 square meters per gram and a water content of 1.1% with 30 g. of octamethylcyclotetrasiloxane which mixture is heated to 280° C. for a 2 hours and then cooled to 200° C. At this temperature, 0.05 ml. addition of trifluoroacetic acid are made at 30 minute intervals and the treatment continues for 30 minutes more, that is, a total of two hours. After the termination of this two hour period, the flask in which the silica filler is present is vented and the silica filler is purged with nitrogen to remove the excess octamethylcyclotetrasiloxane and the trifluoroacetic acid. The sample was then taken and dried at 300° F. for 20 hours in an air oven.

The above procedure was repeated in which 200 g. of the Cab-O-Sil is mixed with 30.0 g. of octamethyldyclotetrasiloxane which is reacted for two hours at 290° C. and then the flask is vented and purged with nitrogen to remove the excess tetrasiloxane. The sample is then taken to an air oven and dried at 300° F. for 20 hours. The two samples that are obtained in accordance with the above treatments are subjected to the aminoxy structure test. The sample with the trifluoroacetic acid has a flow of 0.4 inch after 10 minutes. The sample that is not treated with the trifluoroacetic acid has no flow and crumbles.

EXAMPLE 3

To 200 g. of Cab-O-Sil MS-7 having a surface area of 200 square meters per gram and a water content of 1% there is added 33.0 g. of hexamethylcyclotrisiloxane in the presence of 0.2 mole percent of ammonium hydroxide as taught by the method of Brown et al, in U.S. Pat. 3,334,062. The sample is thus treated for 4 hours at 200° C. The flask in which the silica filler and the trisiloxane are present, as well as the ammonium hydroxide, is then vented and the sample is purged with nitrogen. The thus treated silica filler is then subjected to the aminoxy structure test and is found to have a flow of 0.5 inch after 10 minutes.

It is thus seen that the filler treated in accordance with the present invention resulted in the least structuring of a silanol-terminated organopolysiloxane oil as compared to the filler treated in accordance with the process of Lucas or treated in accordance with the Brown et al. process.

EXAMPLE 4

A pyrogenic Cab-O-Sil silica filler having a surface area of about 200 square meters per gram and containing 1% by weight of absorbed water is treated with octamethylcyclotrisiloxane in accordance with the teachings of Lucas Pat. 2,938,009.

To the same type of pyrogenic silica filler there is added 300 g. of hexamethylcyclotrisiloxane and 1 cc. of trifluoroacetic acid and the mixture is stirred in a simple flask. The reaction is carried out at 170° C. for 4 hours. After the reaction has proceeded for 4 hours, the trifluoroacetic acid and the excess hexamethylcyclotrisiloxane is vented and the treated silica filler is purged with nitrogen. The treated filler is then dried in an oven for 24 hours at 150° C. to obtain a filler free of infrared absorbance at 3760$^{-1}$ cm. and containing about 6.0% by weight of chemically combined dimethylsiloxy units.

To 200 g. of Cab-O-Sil MS-7, which is a pyrogenic treated filler having a surface area of 200 square meters per gram and which has a hydroxyl content of 1.0% by weight there is added 8 g. of hexamethylcyclotrisiloxane and 0.4 mole percent, based on the moles of the filler, of ammonium hydroxide. The untreated filler is subjected to the ammonium hydroxide and cyclotrisiloxane treatment for 4 hours at 150° C. After this time has passed, the reaction mixture is vented and purged with nitrogen. The treated filler is then taken to an air oven and dried for 24 hours at 150° C. This treatment is as substantially set forth in the Brown et al. Pat. 3,334,062.

A mixture of 25 parts of the above treated pyrogenic silica filler is treated in accordance with the present invention and 100 parts of a silanol-terminated polydimethylsiloxane having a viscosity of about 300 centipoises at 25° C. is prepared by incrementally adding the filler to the organopolysiloxane filler with stirring. After the filler has been completely added, there is obtained a silanol-containing polydimethylsiloxane composition having a viscosity of about 400,000 centipoises at 25° C.

The above procedure is repeated except that in the place of the pyrogenic silica filler utilized in the practice of the invention, there is employed a pyrogenic silica filler treated with hexamethylcyclotrisiloxane in accordance with the above-described Lucas patent. There is obtained a silanol-containing polydimethylsiloxane composition consisting of 25 parts filler per 100 parts of silanol-terminated polydimethylsiloxane which has a viscosity of about 410,000 centipoises at 25° C. The time required to mix the hexamethylcyclotrisiloxane treated filler and fluid is about three times the period of time needed to mix the same silanol-containing polydimethylsiloxane with the filler treated in accordance with the practice of the present invention.

The above procedure is repeated again except in place of the pyrogenic silica filler utilized in the practice of the invention, there is employed pyrogenic filler treated in accordance with the method of Brown et al patent. The pyrogenic silica filler treated with ammonium hydroxide and a cyclic trisiloxane is added incrementally in the same manner as with the other procedures. There is obtained a silanol-containing polydimethylsiloxane composition containing 25 parts of filler per 100 parts of silanol-terminated polydimethylsiloxane. This composition has a viscosity of about 415,000 centipoises at 25° C. The time required to mix the Brown et al. treated filler is about 4 times the period of time needed to mix the same silanol-containing polydimethylsiloxane and filler treated in accordance with the practice of the present invention.

Another silanol-containing polydimethylsiloxane composition is made by adding incrementally 100 parts of the above silanol-containing polydimethylsiloxane, 25 parts of untreated pyrogenic silica filler, that is Cab-O-Sil MS-7 that has not been treated by any means whatsoever. It became apparent, however, when about 8 parts of filler are added, the mixture begins to structure and becomes difficult to stir. In order to completely incorporate all of the filler into a silanol-terminated polydimethylsiloxane, it is necessary to heat the mixture with steam for 2 hours at 150° C. At the end of this mixing process there is obtained a silanol-containing polydimethylsiloxane composition having a viscosity of about 420,000 centipoises at 25° C. The samples of the above silanol-containing polydimethylsiloxane compositions mixed with different types of fillers are observed over a period of several months to determine if any of the mixtures increased in viscosity. The following table shows the results obtained with blends of the mixture of silica filler and silanol fluids. In the table, Razzano et al. is the composition of the present invention, Lucas is the composition containing silica filler treated with only hexamethyltrisiloxane, Brown et al. is the composition with the filler treated in accordance with the Brown et al. patent, and control is the composition containing untreated filler. Viscosity represents the initial viscosity, months is the shelf period and percent increase is viscosity over the initial period.

| | Viscosity | Months | Percent increase |
|---|---|---|---|
| Razzano et al. | 400,000 | 6 | 35 |
| Lucas | 410,000 | 4 | Gelled |
| Brown et al. | 415,000 | 6 | 75 |
| Control | 420,000 | 3 | Gelled |

EXAMPLE 5

To 200 parts of Cab-O-Sil MS-7 having a surface area of 200 square meters per gram and a water content 1.8%, there is added 30 g. of octamethylcyclotetrasiloxane which is heated to 250° C. for 2 hours. After this 2 hour period there is added 1.5 parts of trifluoroacetic acid, and the mixture is heated at 250° C. for an additional 2 hour period. After the second 2 hour period had expired, the trifluoroacetic acid and excess octamethylcyclotetrasiloxane is vented and the treated filler is purged with nitrogen. The treated sample of filler is then dried in an air oven at 300° F. for 20 hours. The resulting treated pyrogenic silica filler is found to be free of infrared adsorbance at 3760$^{-1}$ cm. and has about 5% by weight of chemically combined dimethylsiloxy units based on the weight of the filler. It should be mentioned at this point that the lack of infrared adsorbance at 3760$^{-1}$ cm. indicates that the filler was completely free of free hydroxyl groups.

A composition is made by mixing together 100 parts of a silanol-terminated polydimethylsiloxane having a viscosity of about 102,000 centipoises at 25° C. 35 parts of the treated pyrogenic silica filler and 57 parts of a trimethylsiloxy chain-stopped polydimethylsiloxane fluid having a viscosity of around 50 centipoises at 25° C. A curable composition is prepared by adding 2.4 parts of phenyltriethoxysilane to 80 parts of the above silanol-containing polydimethylsiloxane composition along with 0.4 part of dibutyl tindilaurate. The mixture is poured into a plate steel mold to a thickness of 4.75" and allowed to cure for 96 hours at 25° C. A portion of the silanol-containing polydimethylsiloxane composition also is observed over a period of several months to determine whether it had experienced any change of viscosity.

The above procedure is repeated except in place of the pyrogenic silica filler treated in accordance with the present invention, there is employed equal parts by weight of a pyrogenic silica filler created in accordance with the accordance with the method of Lucas utilizing octamethylcyclotetrasiloxane. The initial viscosity of the resulting silanol-containing polydimethylsiloxane composition is found to be 750,000 centipoises at 25° C. A portion of the silanol-containing polydimethylsiloxane also is observed over a period of several months under the same conditions used with the silanol-containing polydimethylsiloxane made in accordance with the invention.

A curable composition also is made in accordance with the previously described procedure except there is substituted for 35 parts of the pyrogenic silica filler repeated in accordance with the present invention, a pyrogenic silica filler that has been treated with only octamethylcyclotetrasiloxane in accordance with the method of Lucas.

The above procedure is repeated except in place of the pyrogenic silica filler treated and prepared in accordance with the present invention, there is used a silica filler treated in accordance with the method of Brown et al. This treatment comprises taking 200 parts of the Cab-O-Sil MS–7 and contacting it with 8 weight percent of hexamethyltrisiloxane in the presence of 1.0 part of ammonium hydroxide and the mixture is heated at 150° C. for 4 hours after which time the excess ammonium hydroxide and cyclotrisiloxane is vented from the treated filler and the filler is purged with nitrogen. The treated filler is then taken and placed in an air oven and dried for 20 hours at 170° C. The treated filler is mixed with a silanol-containing polydimethylsiloxane composition to result in a mixture having a viscosity of 810,000 centipoises at 25° C.

To 100 parts of the silanol-terminated polydimethylsiloxane having a viscosity of 102,000 centipoises at 25° C., there is added 35 parts of the treated filler and 57 parts of trimethylsiloxane chain-stopped polydimethylsiloxy fluid having a viscosity of about 50 centipoises at 25° C. The rest of the procedure in forming the cured silicone rubber composition is the same as that described above in connection with the silica filler treated in accordance with the present invention. A portion of the silanol-containing polydimethylsiloxane also is observed over a period of several months under the same conditions used with the silanol-containing polydimethylsiloxane made in accordance with the present invention and that made in accordance with the process of Lucas. The table below indicates the results obtained with the respective compositions where the terms are as previously defined in Example 4.

|  | Viscosity | Months | Percent increase |
|---|---|---|---|
| Razzano et al | 765,000 | 4 | 38 |
| Lucas | 650,000 | 2 | Gelled |
| Brown et al | 785,000 | 4 | 70 |

The following table shows the results obtained with pure samples of the respective curable compositions where H is hardness in Shore A, is tensile in p.s.i., E is elongation in percent and T' is tear in p.i.

| Composition | H | T | E, percent | T |
|---|---|---|---|---|
| Razzano et al | 28 | 610 | 800 | 150 |
| Lucas | 30 | 580 | 550 | 48 |
| Brown et al | 25 | 560 | 600 | 80 |

What we claim is:
1. A process for treating a reinforcing silica filler so as to render it substantially non-structuring when it is mixed with a convertible polyorganosiloxane comprising contacting at a temperature of 150° C. to 300° C. a finely divided silica having a surface area of at least 50 square meters per gram and containing at least 0.2 weight percent of absorbed water based on the weight of the silica with a cyclic polyorganosiloxane corresopnding to the general formula,

$$(R_2SiO)_n$$

where R is a monovalent hydrocarbon radical and $n$ is an integer equal to from 3 to 9, inclusive, and a fluorine-substituted aliphatic acid which is selected from monocarboxylic aliphatic acids of the formula,

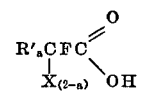

and aliphatic dicarboxylic acids of the formula,

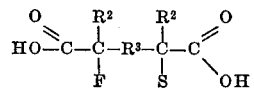

where R, R' are radicals selected from the group consisting of alkyl, alkenyl, aryl, aralkyl, cycloalkyl and cycloalkenyl, X represents fluorine, $R^2$ is selected from fluorine $R^3$ is a divalent hydrocarbon radical selected from alkylene and arylene and $a$ is a whole number which varies from 0 to 1, inclusive.

2. The process of claim 1 wherein said cyclic polyorganosiloxane is brought into contact with said silica prior to bringing said filler into contact with said fluorine-substituted aliphatic acid.

3. The process of claim 2 wherein said cyclic polyorganosiloxane is brought into contact with said silica at substantially the same time said filler is brought into contact with said fluorine-substituted aliphatic acid.

4. The process of claim 3 wherein said fluorine-substituted aliphatic acid is trifluoroacetic acid.

5. The process of claim 3 wherein the cycloorganopolysiloxane is hexamethylcyclotrisiloxane.

6. The process of claim 3 wherein the cycloorganopolysiloxane is octamethylcyclotetrasiloxane.

7. The process of claim 3 wherein the period of contact with the fluorine-substituted aliphatic acid is from 0.5 to 4 hours and further comprising removing the excess fluorine-substituted aliphatic acid from said filler and drying said filler in an oven for at least 1 hour.

8. The process of claim 3 wherein there is present 500 to 4000 parts per million of a fluorine-substituted aliphatic acid based on the weight of said silica.

9. A silica filler produced by the process of claim 1 that is pyrogenic having a surface area of at least 50 square meters per gram and substantially free of infrared absorbance at $3760^{-1}$ cm. containing 5 to 8 percent by weight of diorganosiloxy units chemically combined with said filler.

References Cited

UNITED STATES PATENTS 3,132,961 5/1964 Pierpoint et al. ____ 106—308 Q

JAMES E. POER, Primary Examiner
J. V. HOWARD, Assistant Examiner

U.S. Cl. X.R.

106—309